No. 651,041. Patented June 5, 1900.
W. H. JOHNSTON.
VEHICLE WHEEL.
(Application filed Apr. 13, 1899.)
(No Model.) 2 Sheets—Sheet 1.
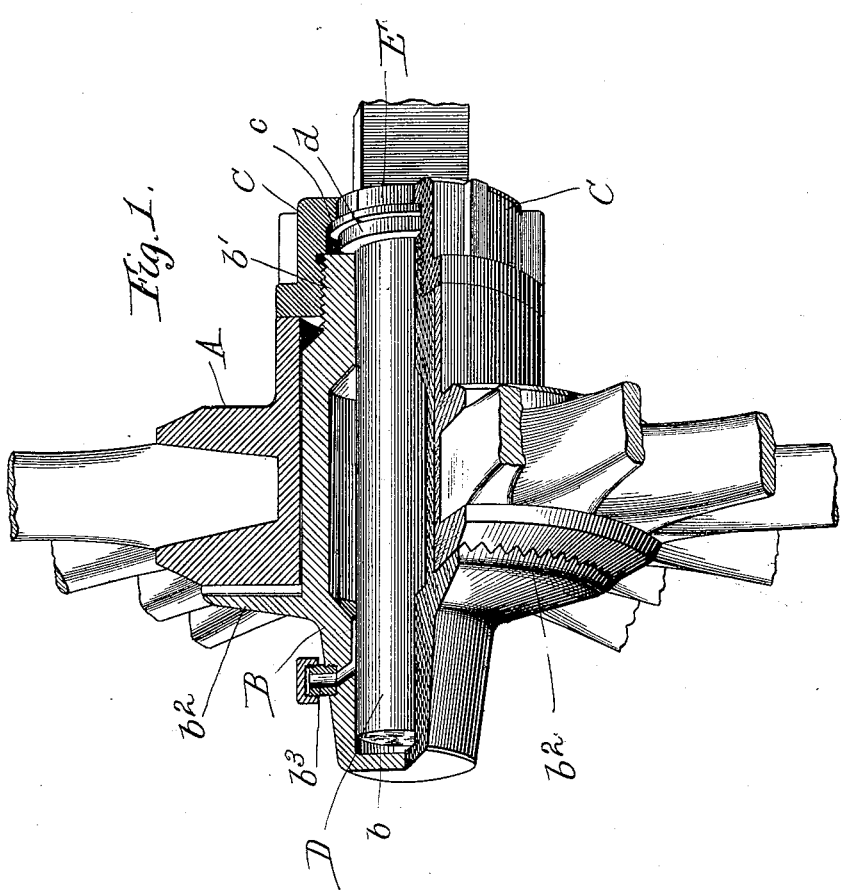
Witnesses:
Wm. M. Rheem
A. F. Durand
Inventor:
William H. Johnston
by Chas. L. Page
Atty.
THE NORRIS PETERS CO., PHOTO-LITHO., WASHINGTON, D. C.

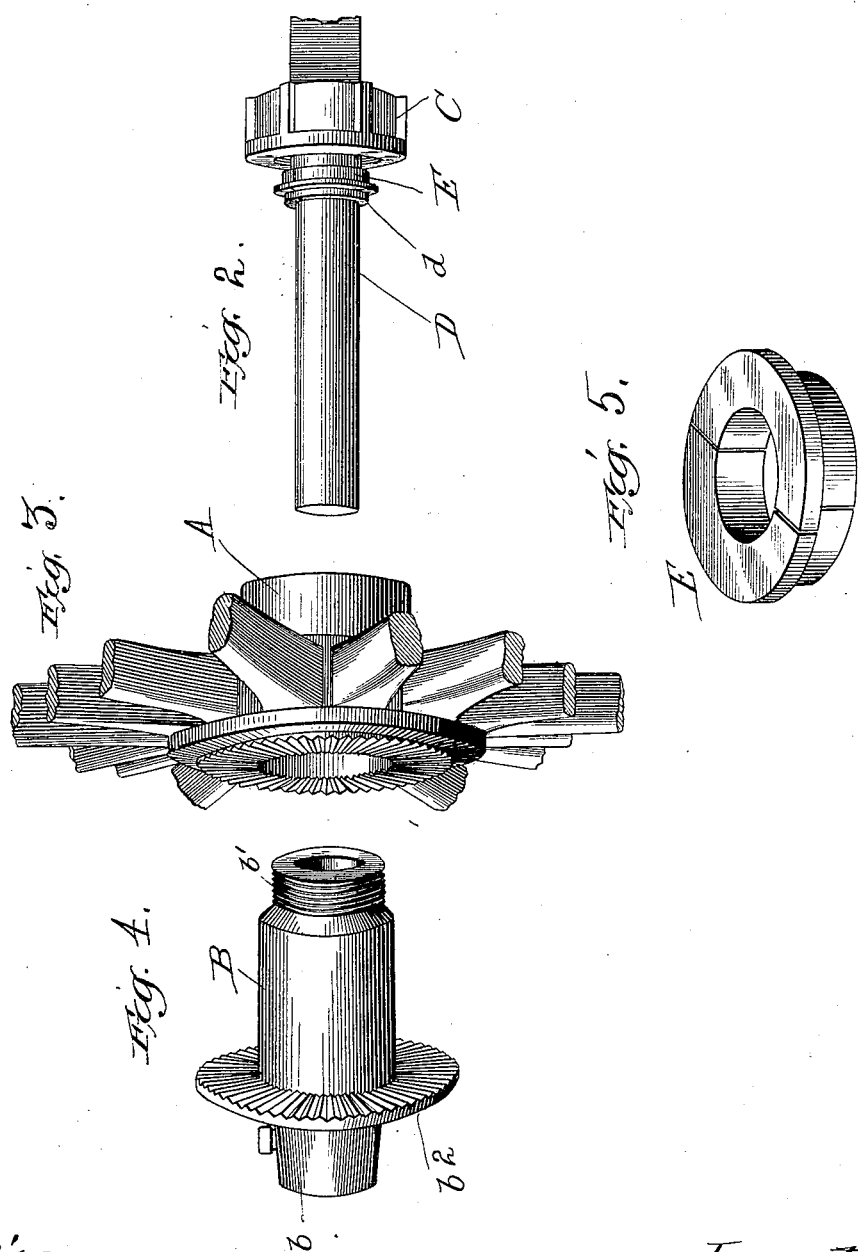

UNITED STATES PATENT OFFICE.

WILLIAM H. JOHNSTON, OF HARVEY, ILLINOIS, ASSIGNOR TO FREDERICK C. AUSTIN, OF CHICAGO, ILLINOIS.

VEHICLE-WHEEL.

SPECIFICATION forming part of Letters Patent No. 651,041, dated June 5, 1900.

Application filed April 13, 1899. Serial No. 712,913. (No model.)

*To all whom it may concern:*

Be it known that I, WILLIAM H. JOHNSTON, a citizen of the United States, and a resident of Harvey, in the county of Cook and State of Illinois, have invented a certain new and useful Improvement in Vehicle-Wheels, of which the following is a specification.

The objects of my invention are to provide a simple, serviceable, and inexpensive vehicle-wheel having a hub preferably constructed entirely of metal and which may be readily and economically repaired when worn out at its bearing portion; to provide a novel construction of vehicle-wheel involving a blind hub and in which the retaining-nut is arranged at the inner end of the hub; to provide an arrangement whereby all threading of the axle may be dispensed with; to provide a vehicle-wheel having a dust-proof hub provided with a removable blind-hub sleeve; to permit the employment of a single nut for both retaining the wheel upon the axle and locking the hub upon the hub-sleeve; to provide a metal wheel having a removable hub-sleeve adapted for removal from the outer end of the hub; to permit a ready removal of both the wheel and retaining-nut from the axle and also to facilitate the removal of the hub-sleeve from the hub, and to provide certain novel details and features of construction tending to increase the efficiency of this class of wheels.

To the attainment of the foregoing and other useful ends, I preferably construct the wheel, at least the hub portion, throughout of iron, steel, or other suitable metal and provide the hub with a removable blind-hub sleeve, which when worn out may be readily removed and replaced with a new one. As a special advantage the hub-sleeve is adapted and arranged to be removed from the outer end of the hub rather than from the latter's inner end, and the inner end portion of the sleeve is threaded to receive a nut, which in addition to firmly clamping or locking the hub upon the sleeve serves also to retain the wheel upon the axle. A split bushing is preferably arranged between the inner end of the hub-sleeve and the retaining-nut, so as to close the interior of the hub against dust and dirt, and as the outer end of the hub-sleeve is also preferably closed or made "blind" the wheel will therefore when properly secured upon the axle have practically a dust-proof hub or bearing, and, furthermore, the provision of the split bushing permits both the wheel and retaining-nut to be readily and easily removed from the axle without employing tools other than the ordinary wagon-wrench, and also the novel construction and arrangement permits the use of an unthreaded axle varying but little from the usual form and pattern. The arrangement of the retaining-nut at the inner end of the hub is also particularly advantageous, so that by so doing the outer end of the hub may be made of a minimum size and cast solid or blind, so as to effectually close the outer portion of the bearing against dust and dirt. A wheel thus constructed is strong, simple, and serviceable and is adapted for use in various ways and in connection with vehicles of all descriptions.

In the accompanying drawings, Figure 1 is a view showing, partly in perspective and partly in section, the hub portion of a wheel constructed in accordance with my invention. Figs. 2, 3, and 4 are perspectives of the axle, hub, and hub sleeve or box, respectively. Fig. 5 is a detail view of the split bushing which I place between the inner end of the hub-sleeve and retaining-nut.

As illustrated, the wheel comprises a hub A of suitable form or pattern and provided with a removable hub-sleeve B. Preferably the outer end $b$ of the latter is closed or made blind, and its inner end portion $b'$ is externally threaded to engage or receive the retaining-nut C. The sleeve is also preferably provided with a flange $b^2$, having a serrated inner surface, and the outer end of the hub is correspondingly serrated, as shown in the drawings. When mounted upon the sleeve, the hub is clamped and firmly held against the serrated surface of the flange, preferably by the retaining-nut, and in this condition the hub and sleeve are of course effectually locked against relative shift or rotation. In Fig. 1 it will also be observed that the bore of the hub-sleeve is enlarged at its middle portion, the recess thus provided affording an oil-chamber, into which lubricating-oil may be poured by way of a duct or opening $b^3$ for the purpose of lubricating the axle. The retaining-nut C is preferably provided with relatively large and small bore portions, the former being partially threaded, so as to screw upon the threaded end portion of the hub-sleeve and the latter being unthreaded and of a size to permit the nut to be readily slipped on and off the axle D, which, it will be observed, is provided with a flange $d$. The latter may be made separate and screwed or shrunk upon the axle, if so desired; but I prefer to form the flange integral with the axle and to make the relatively-small or unthreaded bore portion of the nut large enough to permit the latter to slip over or pass the flange on the axle. The provision of relatively large and small bore portions for the nut serves to provide the latter interiorly with a shoulder $c$, and between the latter and the flange on the axle I interpose a split bushing E. The function of the said bushing is twofold. First, the bushing in conjunction with the flange $d$ serves to provide the axle with a shoulder to enable the nut to hold the wheel upon the axle, and, second, the bushing serves to close the inner end of the hub against dust and dirt. When screwed upon the hub-sleeve, the shoulder $c$ of the retaining-nut will bear against the bushing, and a tightening of the nut will then operate to draw the sleeve up against the opposite side of the flange $d$ in addition to forcing the hub A against the serrated flange $b^2$. It will be seen, therefore, that the nut C also has a double function and that such double function consists in both clamping the hub upon the sleeve and retaining the wheel upon the axle. I may, however, employ separate devices or independent means for performing these two functions and for this reason do not limit myself to the particular arrangement shown and described.

The various parts of the wheel are assembled and the wheel secured upon the axle as follows: First, the hub A is placed upon the sleeve B. Next, the nut C is slipped onto the axle and moved back upon the latter until it passes the flange $d$. The two portions of the split bushing are now adjusted in place upon the axle and the nut then moved outward along the latter until it covers the flange and bushing. After this the wheel is placed upon the axle and the nut C then rotated and screwed upon the threaded end portion of the sleeve, the rotation of the nut operating, as previously stated, to both force the serrated portion of the hub into engagement with the serrated flange $b^2$ and to draw the inner end of the hub-sleeve up against the flange or shoulder $d$. Thus it will be seen that I provide a metal hub having an outwardly-removable hub-sleeve B and that by such provision the bearing portion of the wheel may be readily removed and replaced with a new one when worn out or impaired by extended use; that the arrangement of the retaining-nut C at the inner end of the hub has the double advantage of enabling one device to perform two functions and permitting the outer end of the hub to be permanently closed or cast blind and also that such arrangement makes the hub or bearings practically dust-proof; that the construction permits the use of an axle D, varying but little from the usual form, and that by thus screwing the retaining-nut C upon the sleeve instead of upon the axle I am enabled to dispense with all threading of the latter, and, furthermore, that while the hub is made blind and the retaining-nut arranged at the inner end thereof both the wheel and nut are readily removed from the axle without employing more than one tool—as, for instance, an ordinary wagon-wrench or spanner.

What I claim as my invention is—

1. A vehicle-wheel comprising a blind-hub sleeve provided with a flange or shoulder and having its inner end threaded, a hub proper having a bore adapted to receive the hub-sleeve and having its outer end adapted to engage the flange or shoulder on the said sleeve, an axle or spindle upon which the sleeve is mounted for rotation and which is provided with a flange or shoulder, and a retaining-nut which is screwed onto the threaded inner end of the hub-sleeve and which is provided with a shoulder which abuts against the flange or shoulder of the axle, the said nut also bearing or abutting against the inner end of the hub proper so as to force the latter's outer end into engagement with the said flange or shoulder on the hub-sleeve, substantially as described.

2. A vehicle-wheel comprising an axle or spindle provided with a flange or shoulder, a hub-sleeve arranged upon the said spindle and provided with a flange or shoulder, a hub proper arranged upon the said sleeve and having its outer face or end adapted to engage the said flange or shoulder on the sleeve, a retaining-nut provided internally with a shoulder and screwed upon the inner end of the hub-sleeve in such manner as to bear against the hub proper and thereby force or crowd the latter against the flange or shoulder on the said sleeve, and a split bushing arranged between the flange or shoulder on the axle and the said nut, substantially as described.

3. The combination of the spindle provided with a flange or shoulder, a blind-hub sleeve which is chambered or recessed at its middle and which has its inner end portion reduced and externally threaded, the said sleeve being also provided with a flange or shoulder, a hub proper having its outer end adapted to engage the inner surface of the said flange or shoulder on the sleeve, a retaining-nut having relatively large and small bore portions which in effect provide the nut internally with a shoulder or bearing-face, the relatively-large bore portion of the nut being threaded and adapted to engage the reduced screw-threaded inner end portion of the hub-sleeve, and a split or two-part bushing arranged between the shoulder or bearing-face of the nut and the flange or shoulder on the spindle, substantially as and for the purposes described.

4. In a vehicle-wheel, and in combination with an axle having a shoulder, a flanged hub-sleeve, a hub mounted upon said sleeve, a retaining-nut screwed upon the inner end portion of the hub-sleeve, the said nut being provided internally with a shoulder which abuts against the shoulder on the axle, so as to retain the wheel upon the latter, and the said nut serving also to clamp the hub against the flange on the hub-sleeve.

5. In a vehicle-wheel, and in combination with a flanged axle, a flanged hub-sleeve, a hub mounted upon the latter, a retaining-nut screwed upon the inner end of the hub-sleeve and provided internally with a shoulder, and a split bushing arranged between the flange on the axle and the shoulder on the nut, the latter by such arrangement serving to both clamp the hub against the flange on the sleeve and retain the wheel upon the axle.

6. In a vehicle-wheel, and in combination with a flanged axle, a hub-sleeve having its outer end closed or made blind and also provided with a serrated flange, a hub mounted upon the sleeve and having its outer end serrated to engage the serrated flange on the sleeve, a retaining-nut screwed upon the inner end portion of the hub-sleeve and provided internally with a shoulder, and a split bushing arranged between the flange on the axle and the shoulder on the nut, the latter by such arrangement serving to both clamp the hub upon the hub-sleeve and retain the wheel upon the axle.

7. In a vehicle-wheel, the combination of the axle having a flange or shoulder, the hub-sleeve having its outer end $b$ closed or cast blind and its inner end portion externally threaded, the sleeve being provided at or near its outer end with a serrated flange $b^2$, a hub mounted upon the said sleeve and clamped between the said serrated flange and a retaining-nut screwed upon the inner end of the hub, and a split bushing E arranged between the flange or shoulder on the axle and a shoulder on the nut.

WILLIAM H. JOHNSTON.

Witnesses:
M. L. PURVIN,
F. C. AUSTIN.